(12) United States Patent
Phillips

(10) Patent No.: US 6,790,559 B2
(45) Date of Patent: Sep. 14, 2004

US006790559B2

(54) ALKALINE CELLS HAVING POSITIVE NICKEL HYDROXIDE ELECTRODES WITH FLUORIDE SALT ADDITIVES

(75) Inventor: Jeffrey Phillips, Santa Clara, CA (US)

(73) Assignee: PowerGenix Systems, Inc., Yukon (CA)

(*) Notice: Subject to any disclaimer, the term of this patent is extended or adjusted under 35 U.S.C. 154(b) by 177 days.

(21) Appl. No.: 10/098,194

(22) Filed: Mar. 15, 2002

(65) Prior Publication Data

US 2002/0192547 A1 Dec. 19, 2002

Related U.S. Application Data

(60) Provisional application No. 60/276,291, filed on Mar. 15, 2001.

(51) Int. Cl.[7] .................................. H01M 4/32
(52) U.S. Cl. .................. 429/223; 429/231; 429/232; 429/206; 429/207; 429/229; 429/209
(58) Field of Search ................ 429/223, 231, 429/232, 206, 207, 229, 209

(56) References Cited

U.S. PATENT DOCUMENTS

| | | | |
|---|---|---|---|
| 3,607,437 A | * | 9/1971 | Minagawa et al. ......... 429/207 |
| 3,870,564 A | | 3/1975 | Takamura et al. |
| 3,951,687 A | | 4/1976 | Takamura et al. |
| 4,017,665 A | | 4/1977 | Sandera et al. |
| 4,224,391 A | | 9/1980 | Eisenberg |
| 4,273,841 A | | 6/1981 | Carlson |
| 4,358,517 A | | 11/1982 | Jones |
| 5,215,836 A | | 6/1993 | Eisenberg |
| 5,453,336 A | | 9/1995 | Adler et al. |
| 5,489,314 A | | 2/1996 | Bogauchi et al. |
| 5,759,718 A | | 6/1998 | Yao et al. |
| 6,287,726 B1 | * | 9/2001 | Ohta et al. .................. 429/223 |

FOREIGN PATENT DOCUMENTS

| | | | |
|---|---|---|---|
| EP | 0833397 | | 4/1976 |
| EP | 0457354 | | 11/1991 |
| EP | 0697746 | | 2/1996 |
| JP | 52-25240 | * | 2/1977 |
| JP | 52908540 A2 | | 11/1993 |
| JP | 11007949 A2 | | 1/1999 |
| JP | 11-345613 | * | 12/1999 |
| JP | 2000-173614 | | 6/2000 |

* cited by examiner

*Primary Examiner*—Laura Weiner
(74) *Attorney, Agent, or Firm*—Beyer Weaver & Thomas, LLP

(57) ABSTRACT

A nickel zinc alkaline cell has a zinc oxide negative electrode supported on a conductive substrate, an alkaline electrolyte, and a positive electrode having nickel hydroxide paste supported on a conductive substrate. The positive electrode further comprises 0.01% to 1% by weight of a fluoride salt, which is a salt of a metal chosen from the group consisting of: potassium, sodium, lithium, rubidium, caesium, a group II metal, a group III metal, a d-block transition metal, an f-block lanthanide, and mixtures thereof. Typically, the fluoride salt is potassium fluoride.

9 Claims, No Drawings

ALKALINE CELLS HAVING POSITIVE NICKEL HYDROXIDE ELECTRODES WITH FLUORIDE SALT ADDITIVES

This application claims benefit of provisional application Ser. No. 60/276,291 filed Mar. 15, 2001.

FIELD OF THE INVENTION

This invention relates to alkaline galvanic cells, and particularly to nickel zinc alkaline cells which have a zinc oxide negative electrode, an alkaline electrolyte, and a nickel hydroxide positive electrode.

DESCRIPTION OF THE PRIOR ART

A number of prior art patents teach various approaches to improve the performance of alkaline cells, including alkaline cells having pasted nickel hydroxide positive electrodes, alkaline cells having rechargeable zinc negative electrodes, various electrolyte formulations, and so on. Also, it is well known that the performance of pasted nickel hydroxide electrodes, for example, can be improved by the provision of light weight current collectors, and by increasing the packing density of the nickel hydroxide active material, thereby improving the achievable energy density of the electrodes.

It is also well known to provide conductive diluents such as nickel powder and cobalt oxide to improve active material utilization. For example, YAO et al U.S. Pat. No. 5,759,718, issued Jun. 2, 1998, teaches the provision of alkaline storage batteries wherein cobalt hydroxide having specific characteristics is added to the positive electrode active material.

Likewise, BOGAUCHI et al, U.S. Pat. No. 5,489,314, issued Feb. 6, 1996, teach an alkaline battery having a nickel plate on which cobalt oxyhydroxide is previously formed on the surfaces of the positive active material powder.

In the above patents, as the CoO material slowly dissolves during the initial charge, and is oxidized to conductive insoluble CoOOH, a conductive network is set up in situ within the structure of the nickel hydroxide electrode.

In some instances, an external chemical oxidant is used to promote the reaction, as is also taught by the Bogauchi et al patent.

The performance of rechargeable zinc electrodes in alkaline electrolytes is the subject, for example, of JONES U.S. Pat. No. 4,358,517, issued Nov. 9, 1982. This patent teaches a nickel-zinc cell where the zinc electrode has a copper grid and an active material that comprises zinc-rich particles, calcium-rich particles, and an entanglement of cellulose fibres. Lead compounds may also be added to improve turn around efficiency and to reduce water loss.

The use of buffered electrolytes is also contemplated, for improvement of rechargeable zinc cells. ADLER et al U.S. Pat. No. 5,453,336, issued Sep. 26, 1995, teaches the use of an electrolyte that contains one or more hydroxides of an alkali metal, one or more fluorides of an alkali metal, and one or more carbonates of an alkali metal.

Another patent which teaches a ternary electrolyte for secondary electrochemical cells is CARLSON U.S. Pat. No. 4,273,841, issued Jun. 16, 1981, which teaches an aqueous alkaline solution having potassium hydroxide, potassium fluoride, and potassium phosphate.

EISENBERG U.S. Pat. No. 4,224,391 issued Sep. 23, 1980, and U.S. Pat. No. 5,215,836 issued Jun. 1, 1993, each describe electrolyte formulations that employ mixtures of potassium hydroxide and boric, phosphoric, or arsenic acids.

BACKGROUND OF THE INVENTION

As noted, pasted nickel hydroxide electrodes can have their performance improved by the addition of conductive diluents to improve active material utilization, and such as to establish a conductive insoluble CoOOH network in situ within a pasted nickel hydroxide electrode.

However, the problem of low positive electrode efficiency is exacerbated, sometimes significantly, when their use in nickel zinc batteries is considered, because of the electrolyte requirements of the zinc electrode.

Of course, it is well known that performance inhibiting disfigurement or rearrangement of zinc electrodes can occur during the cycling process of rechargeable zinc electrodes in alkaline electrolytes. Such disfigurement can be minimized in more dilute alkali hydroxide solutions.

The Jones Patent, noted above, appears to be somewhat effective in extending cycle life of the cell by the addition of calcium hydroxide to the zinc electrode.

It has also been noted that buffered electrolytes with or without fluoride additions may also result in increased zinc electrode lifespan. They are particularly described in the Adler et al patent, noted above, where a mixture of alkaline electrolyte having a strength of 2M to 12M is combined with a carbonate of 0.5M to 4M, and a fluoride of 0.5M to 4M.

The Carlson Patent, noted above, describes a mixture that employs 5% to 10% of hydroxide, 10% to 20% of phosphate, and 5% to 15% of fluoride.

However, an undesirable feature of all of these approaches is the diminished utilization of nickel hydroxide as the electrolyte is diluted below the optimal 30% by weight of potassium hydroxide.

It is always to be noted that nickel is one of the more expensive components of a nickel zinc cell, so that it is important to maximize its efficiency during charge and discharge. This problem has been addressed by such as the addition of calcium fluoride so as to improve high temperature charge acceptance, as discussed in Japanese Patent JP5290840A2.

Also, nickel hydroxide particle modification has been addressed with the use of yttrium, scandium, or lanthanide hydroxide, oxide, or fluoride, as taught in Japanese Patents JP11007949 and JP173614A2.

SUMMARY OF THE INVENTION

The present inventor has unexpectedly found that small additions of fluoride to the nickel hydroxide paste which is employed in the production of positive electrodes for nickel zinc cells has resulted in significant improvements in active material utilization.

To that end, therefore, the present invention provides a nickel zinc alkaline cell having a zinc oxide negative electrode supported on a conductive substrate, an alkaline electrolyte, and a positive electrode having nickel hydroxide paste supported on a conductive substrate.

The positive electrode further comprises 0.01% to 1% by weight of a fluoride salt.

The fluoride salt is a salt of a metal which is chosen from the a group consisting of: potassium, sodium, lithium, rubidium, caesium, a group II metal, a group III metal, a d-block transition metal, an f-block lanthanide, and mixtures thereof.

Typically, the fluoride salt is potassium fluoride.

Also, typically the potassium fluoride is used in the amount of about 0.1% by weight of the nickel hydroxide.

The nickel hydroxide positive electrode may further comprise a conductivity enhancement additive which is chosen from the group consisting of: 2% to 3% by weight of nickel metal powder, 2% to 3% by weight of cobalt metal powder, and mixtures thereof.

Also, it has been found particularly to be effective when the alkaline electrolyte comprises a mixture of sodium hydroxide, potassium hydroxide, lithium hydroxide, and an acid chose from the group consisting of: boric acid, phosphoric acid, and mixtures thereof.

When boric acid is present, it has a concentration of 0.6 to 1.3 moles per liter.

The stoichiometric excess of alkali hydroxide is between 2.0 moles and 4.0 moles.

Also, lithium hydroxide is present in the amount of about 0.2 moles.

DETAILED DESCRIPTION OF THE PREFERRED EMBODIMENTS

The novel features which are believed to be characteristic of the present invention, as to its structure, organization, use and method of operation, together with further objectives and advantages thereof, will be better understood from the following discussion.

As noted, the addition of small amounts of fluoride to nickel hydroxide paste will result in significant improvements in active material utilization. The fluoride is dissolved in the water of the paste, during paste manufacture for the paste of the positive electrode, and thus even distribution of the fluoride within the nickel hydroxide paste is ensured.

Typical nickel zinc cells were constructed for purposes of experimentation with respect to the present invention, and the cells were constructed in keeping with the present invention having the addition of fluoride to the nickel hydroxide paste.

Thus, a typical cell comprises a pasted nickel hydroxide positive electrode and a slurry coated zinc oxide negative electrode, with at least 100% coulombic excess of zinc oxide over the nickel hydroxide content.

Typically, the conducting substrate for the nickel hydroxide positive electrode is a nickel foam; and typically, the conductive substrate for the zinc oxide negative electrode is copper expanded metal.

Conductive enhancement additives were included in the positive electrode paste formulation, and comprised up to 2% to 3% by weight of each of nickel metal powder and cobalt metal powder.

The formulation of the zinc electrode was such as to contain 89% to 95% zinc oxide powder, 3% to 9% bismuth oxide, and 1% to 2% of a binder.

A typical electrolyte, being one which was employed in the experimentation phases of the present invention, had a formulation comprising a mixture of sodium hydroxide, potassium hydroxide, and lithium hydroxide, together with boric acid, and phosphoric acid. The concentration of boric acid was 0.6 moles to 1.3 moles per liter.

In any event, the stoichiometric excess of alkali hydroxide was between 2.0 moles and 4 moles; and lithium hydroxide was present in the amount of about 0.2 moles.

Four cell types were built, each having a capacity of approximately 2 Ampere Hours.

The type 1 cell was constructed in the manner described above, except that the nickel hydroxide paste included 0.1% by weight of potassium fluoride.

The type 2 cell was constructed as described above, but with no fluoride additive to the positive electrode.

The type 3 cell was a standard cell, having no fluoride additive in the positive electrode, but having 0.1 mole fluoride buffering in the electrolyte.

The type 4 cell was constructed as the type 3 cell, except that it had 0.02 mole fluoride buffering in the electrolyte.

After construction, the cells were subjected to a preliminary charge over 48 hours, so as to input 150% of the theoretical capacity of the nickel electrode.

Thereafter, the cells were discharged at 1 Ampere, and utilization of the positive electrode was measured. The results are shown in Table 1, below:

TABLE 1

| Cell Type | Nickel Electrode | Electrolyte | % Utilization at 1 Amp |
| --- | --- | --- | --- |
| 1 | 0.1% F1 | F1 Free | 89 |
| 2 | Standard | F1 Free | 76 |
| 3 | Standard | 0.1M F1 | 77 |
| 4 | Standard | 0.1M F1 | 75 |

It is clear that the cell type 1 showed the highest utilization of the nickel hydroxide positive electrode, at 89%. This cell had 0.1% potassium fluoride additive to the nickel hydroxide electrode.

It will be seen that the nickel hydroxide electrode utilization of cell type 1 was 17% higher than that of cell type 2, which contained no potassium fluoride additive to the nickel hydroxide electrode.

It will also be seen that the addition of fluoride buffering to the electrolyte showed no improvement over a standard cell type 2, as seen with respect to cell types 3 and 4.

Further tests were conducted at a discharge rate of up to 4 Amperes, and the relative order of nickel utilization, as shown in Table 1, was not changed. The cell type 1 showed the highest active material utilization of the nickel hydroxide positive electrode, in all events.

The beneficial effects of additions of fluoride salts to the nickel hydroxide electrode of nickel zinc alkaline cells has been demonstrated. Other modifications and variations are clearly within the skill of the skilled practitioner, and modifications can be made without departing from the spirit and scope of the appended claims.

For example, it will be recognized that other suitable fluorides than potassium fluoride include sodium fluoride, lithium fluoride, rubidium fluoride, and caesium fluoride, and in any event in an amount of 0.01% up to 1% by weight of the nickel hydroxide electrode.

Still other suitable fluorides include fluorides of group II metals taken from the Periodic Table, fluorides of group III metals taken from the Periodic Table, fluorides of d-block transition metals taken from the Periodic Table, and fluorides of f-block lanthanides taken from the Periodic Table.

Other modifications and alterations may be used in the design and manufacture of the apparatus of the present invention without departing from the spirit and scope of the accompanying claims.

What is claimed is:

1. A nickel zinc alkaline cell having a zinc oxide negative electrode supported on a conductive substrate, an alkaline electrolyte, and a positive electrode having nickel hydroxide supported on a conductive substrate;

wherein said positive electrode further comprises 0.01% to 1% by weight of a fluoride salt and a conductivity enhancement additive selected from the group consisting of nickel metal powder, cobalt metal powder, and mixtures thereof; and wherein said fluoride salt is a salt of a metal selected from the group consisting of: potassium, sodium, lithium, rubidium, caesium, a group II metal, a group III metal, a d-block transition metal, an f-block lanthanide, and mixtures thereof.

2. The nickel zinc alkaline cell of claim 1, wherein said fluoride salt is potassium fluoride.

3. The nickel zinc alkaline cell of claim 2, wherein said alkaline electrolyte comprises a mixture of sodium hydroxide, potassium hydroxide, lithium hydroxide, and an acid selected from the group consisting of: boric acid, phosphoric acid, and mixtures thereof, wherein when boric acid is present, it has a concentration of 0.6 to 1.3 moles per litre;

wherein the stoichiometric excess of alkali hydroxide is between 2.0 mole and 4.0 moles; and wherein the electrolyte contains lithium hydroxide.

4. The nickel zinc alkaline cell of claim 2, wherein said fluoride salt is potassium fluoride in the amount of 0.1% by weight of said nickel hydroxide.

5. The nickel zinc alkaline cell of claim 1, wherein said alkaline electrolyte comprises a mixture of sodium hydroxide, potassium hydroxide, lithium hydroxide, and an acid selected from the group consisting of: boric acid, phosphoric acid, and mixtures thereof;

wherein when boric acid is present, it has a concentration of 0.6 to 1.3 moles per litre;

wherein the stoichiometric excess of alkali hydroxide is between 2.0 mole and 4.0 moles; and wherein the electrolyte contains lithium hydroxide.

6. The nickel zinc cell of claim 1, wherein said alkaline electrolyte comprises boric acid, phosphoric acid, or a mixture thereof.

7. The nickel zinc cell of claim 1, wherein said electrolyte comprises boric acid in concentration of 0.6 to 1.3 moles per litre.

8. The nickel zinc cell of claim 1, wherein said alkaline electrolyte comprises lithium hydroxide.

9. The nickel zinc cell of claim 1, wherein the negative electrode comprises bismuth oxide and a binder.

\* \* \* \* \*